US008977763B1

United States Patent
Brown et al.

(10) Patent No.: US 8,977,763 B1
(45) Date of Patent: Mar. 10, 2015

(54) SYSTEMS AND METHODS FOR DISTRIBUTING STREAMS AND STREAM METADATA

(75) Inventors: Scott K. Brown, Ashburn, VA (US); Stephen E. Loomis, Redwood City, CA (US); David L. Biderman, San Francisco, CA (US)

(73) Assignee: AOL Inc., Dulles, VA (US)

( * ) Notice: Subject to any disclaimer, the term of this patent is extended or adjusted under 35 U.S.C. 154(b) by 1350 days.

(21) Appl. No.: 10/830,407

(22) Filed: Apr. 23, 2004

Related U.S. Application Data (60) Provisional application No. 60/465,267, filed on Apr. 25, 2003.

(51) Int. Cl.
*G06F 15/16* (2006.01)

(52) U.S. Cl.
USPC .......................................... 709/231

(58) Field of Classification Search
CPC ... H04W 88/04; H04W 76/002; H04H 20/02; H04L 12/189; H04L 49/201
USPC .......................................... 709/231
See application file for complete search history.

(56) References Cited

U.S. PATENT DOCUMENTS

| 5,778,187 | A | 7/1998 | Monteiro et al. |
| 5,983,005 | A | 11/1999 | Monteiro et al. |
| 6,434,622 | B1 | 8/2002 | Monteiro et al. |
| 6,925,499 | B1 * | 8/2005 | Chen et al. ................... 709/226 |
| 6,934,837 | B1 * | 8/2005 | Jaisimha et al. .............. 713/151 |
| 7,028,071 | B1 * | 4/2006 | Slik ............................... 709/201 |
| 7,039,784 | B1 * | 5/2006 | Chen et al. ..................... 711/170 |
| 7,043,524 | B2 * | 5/2006 | Shah et al. ..................... 709/203 |
| 7,054,949 | B2 * | 5/2006 | Jennings ......................... 709/238 |
| 7,073,191 | B2 * | 7/2006 | Srikantan et al. ............... 725/87 |
| 7,228,562 | B2 * | 6/2007 | Kobayashi et al. ............. 726/12 |
| 7,237,007 | B2 * | 6/2007 | Kamath et al. ................ 709/206 |
| 7,237,118 | B2 * | 6/2007 | Himberger et al. ........... 713/182 |
| 7,617,295 | B1 * | 11/2009 | Farber et al. .................. 709/217 |
| 2002/0078464 | A1 * | 6/2002 | Dravida et al. ............... 725/105 |
| 2003/0229900 | A1 * | 12/2003 | Reisman .......................... 725/87 |
| 2003/0236912 | A1 | 12/2003 | Klemets et al. |
| 2004/0003101 | A1 * | 1/2004 | Roth et al. ..................... 709/231 |
| 2004/0128399 | A1 * | 7/2004 | Kurrasch ....................... 709/250 |
| 2006/0064500 | A1 * | 3/2006 | Roth et al. ..................... 709/231 |
| 2008/0215748 | A1 * | 9/2008 | Kagan et al. .................. 709/232 |

* cited by examiner

*Primary Examiner* — Ranodhi Serrao
*Assistant Examiner* — Thomas Richardson
(74) *Attorney, Agent, or Firm* — Finnegan, Henderson, Farabow, Garrett & Dunner LLP (57) ABSTRACT

A broadcaster may be configured to use a media protocol to provide a distribution point with a stream. The broadcaster uses a controller configured to implement the media protocol that includes a message class indicating an applicability of a message to a distribution point. The media protocol includes an authentication message structured and arranged to authenticate an establishment of a stream for distribution on the distribution point, a stream configuration message structured and arranged to configure the stream being distributed on the distribution point, a connection message structured and arranged to distribute the stream, and a stream session termination message structured and arranged to terminate a streaming session that has been established.

23 Claims, 4 Drawing Sheets

Fig. 4

SYSTEMS AND METHODS FOR DISTRIBUTING STREAMS AND STREAM METADATA

CROSS-REFERENCE TO RELATED APPLICATIONS

This application claims priority to U.S. Provisional Application No. 60/465,257, filed Apr. 25, 2003, entitled "A Media Protocol."

TECHNICAL FIELD

This document relates to a media protocol and systems that exchange data across a network.

BACKGROUND

Communications protocols may be used to exchange information between two different systems.

DETAILED DESCRIPTION

Communications networks such as the Internet enable content to be distributed to many types of devices in many formats. For example, audio and video signals may be digitized, compressed, and transmitted to Personal Computers (PCs) on the Internet. The PCs may access Internet radio stations and video streams.

A media protocol may be used to dynamically establish communications between a broadcaster (e.g., a source of a stream), a distribution point, and a listener (e.g., a PC). The media protocol may be used to establish streams on distribution points that best support listener demands.

An Internet-based video news service will be used to illustrate how a media protocol may be used to dynamically support listener demands. A news provider with an Internet-based video distribution network may maintain multiple international and domestic news reporting teams. When an event of international significance or appeal occurs, a responding International news reporting team goes on location and reports the event by video. The video is then sent by satellite to a news coordination center. The news coordination center may evaluate the video and appreciate that the video is of international significance. Due to the international significance, the news coordination center determines that demand for the video will be strong throughout the world. Accordingly, the news coordination center uses a media protocol to distribute the video throughout the world.

More particularly, the news coordination center encodes the video, compresses the encoded video to produce a video stream, and loads the video stream to a broadcaster. The news coordination center uses the media protocol to instruct the broadcaster to distribute the video stream to one or more distribution points. The news coordination center then uses the media protocol to configure distribution points to respond to listener requests and to distribute the stream in response. The news coordination center also loads links referencing an appropriate distribution point to a web site so that listener devices requesting the video stream are referred to the appropriate distribution point.

As one illustration of how a stream may be selectively forwarded using the media protocol, the news coordination center may receive a second video from a domestic news reporting team. The news coordination center determines that the second video will attract a large number of requests from a particular region of the country and a low number of requests from other regions of the country. In response, the news coordination center loads the second video to a broadcaster, and uses the media protocol to configure the broadcaster and a regional distribution point that serves the particular region of the country to distribute the second video. The regional distribution point may reside closer to the region such that higher network utilization resulting from a large number of users retrieving the second video from across the country is reduced. In one sense, the regional distribution point is identified as closer from a network standpoint in that there is more available bandwidth or a lower link count or cost between a distribution point and a listener community. In another sense, the regional distribution point may be selected based on geographic proximity to the listener community. The news coordination center then may load links to a web server so that listeners from the particular area of the country access the regional distribution point. The news coordination center also may use the media protocol to load the second video to a national distribution point configured to support low volume traffic from the other regions of the country. If the news coordination center detects that the demand for the second video on the national distribution point increases, the news coordination center may use the media protocol to establish additional distribution points in response to the demand.

Figure 1:
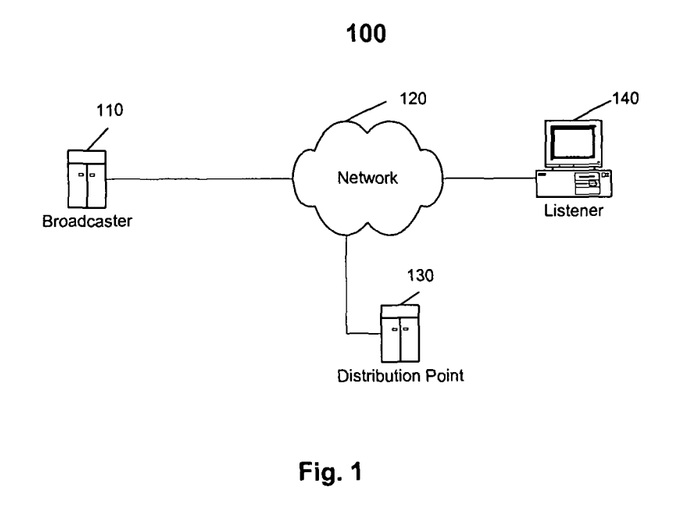
FIG. 1 is a block diagram of an exemplary communications system configured to distribute content using a media protocol.

FIG. 1 is a block diagram of an exemplary communications system 100 configured to distribute a stream using a media protocol. The communications system 100 includes a broadcaster 110, a network 120, a distribution point 130, and a listener 130. The systems in communications system 100 are configured to use a media protocol to distribute and receive a stream. The broadcaster 130 may use a broadcaster component of the media protocol to distribute the stream to a distribution point 130. The distribution point may use a listener component of the media protocol to distribute the stream to a listener 140.

The broadcaster 110 generally includes one or more devices configured to distribute digital content. For example, the broadcaster 110 may include a server or a duplicating switch.

Typically, a broadcaster 110 includes a collection or library of content for distribution. Alternatively, or in addition, the broadcaster may convert a media source (e.g., a video or audio feed) into a first feed of data units for transmission across the network 120. The broadcaster 110 may include a general-purpose computer having a central processor unit (CPU), and memory/storage devices that store data and various programs such as an operating system and one or more application programs. Other examples of a broadcaster 110 include a workstation, a server, a special purpose device or component, a broadcast system, other equipment, or some combination thereof capable of responding to and executing instructions in a defined manner. The broadcaster 110 also may include an input/output (I/O) device (e.g., video and audio input and conversion capability), and peripheral equipment such as a communications card or device (e.g., a modem or a network adapter) for exchanging data with the network 120.

The broadcaster 110 includes playlisting software configured to manage the distribution of content. The playlisting software organizes or enables access to content by a listener community. For example, the broadcaster 110 may be operated by an Internet radio station that is supporting a user community by streaming an audio signal, and may arrange a sequence of songs accessed by the user community.

The broadcaster may include a duplicating switch (not shown). Generally, a duplicating switch includes a device that performs network operations and functions in hardware (e.g., in a chip or part of chip). In some implementations, the duplicating switch may include an ASIC ("Application Specific Integrated Circuit") that implements network operations logic directly on a chip (e.g., that includes gates fabricated on a silicon wafer and then manufactured into a chip). For example, an ASIC chip may perform filtering by receiving a packet, examining the IP address of the received packet, and filtering based on the IP address by implementing a gate structure in silicon.

Implementations of the device included in the duplicating switch may employ a Field Programmable Gate Array (FPGA). A FPGA is generally defined as including a chip or chips fabricated to allow a third party designer to implement a variety of designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating switch also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

The network 120 may include hardware and/or software capable of enabling direct or indirect communications between the broadcaster 110, the distribution point 130, and the listener 140. As such, the network 120 may include a direct link between the broadcaster and the listener, or it may include one or more networks or subnetworks between them (not shown). Each network or subnetwork may include, for example, a wired or wireless data pathway capable of carrying and receiving data. Examples of the delivery network include the Internet; the World Wide Web; a WAN ("Wide Area Network"); a LAN ("Local Area Network"); analog or digital wired and wireless telephone networks; radio, television, cable and satellite networks; and/or any other delivery mechanism for carrying data.

The distribution point 130 includes a device configured to receive content from a broadcaster 110 and distribute the content to one or more listeners 140. Generally, the distribution point 130 may include the server and/or duplicating switches described previously.

The listener 140 may include one or more devices capable of accessing content on the distribution point 130. The listener 140 may include a controller (not shown) that processes instructions received from or generated by a software application, a program, a piece of code, a device, a computer, a computer system, or a combination thereof, which independently or collectively direct operations of the listener 140. The instructions may be embodied permanently or temporarily in any type of machine, component, equipment, storage medium, or propagated signal that is capable of being delivered to the listener 140 or that may reside with the controller of the listener 140. Listener 140 may include a general-purpose computer (e.g., a PC) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the listener 140 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, listener 140 may include a wireless telephone running a micro-browser application on a reduced operating system with general purpose and specialized hardware capable of operating in mobile environments.

The listener 140 may include one or more media applications. For example, the listener 140 may include a software application that enables the listener 140 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite. In another example, the controls may enable the user to rewind or fast-forward a received media stream. For example, if a user does not care for a track on a particular station, the user may interface with a "next track" control that will queue up another track (e.g., another song).

The reference to a particular system as a broadcaster 110, a distribution point 130, or a listener 140, and the corresponding media protocol may depend on the relationship between a system of interest and the systems with which the system of interest is communicating. Although a common configuration may include using a server as a broadcaster 110 and a duplicating switch as a distribution point 130, a broadcaster component of the media protocol is not limited to being employed by a server and a listener component of the media protocol is not limited to being employed by a duplicating switch. For example, a three-tiered hierarchy of distribution may be used. A server configured to convert an analog audio signal into a stream may be used in a first tier. The second tier may include duplicating switches configured to receive the stream from the server in the first tier and to distribute the stream to duplicating switches in a third tier. The third tier may include duplicating switches configured to support a listener community through a cable distribution system. Thus, the server in the first tier uses a broadcaster component of the media protocol to provide the stream to the duplicating switches in the second tier. The duplicating switches in the second tier use the broadcaster component of the media protocol to receive the stream from the server in the first tier and also to provide the stream to the duplicating switches in the third tier. The duplicating switches in the third tier use the broadcaster component of the media protocol to receive the stream and use the listener component of the media protocol to distribute the stream to a listener.

Figure 2:
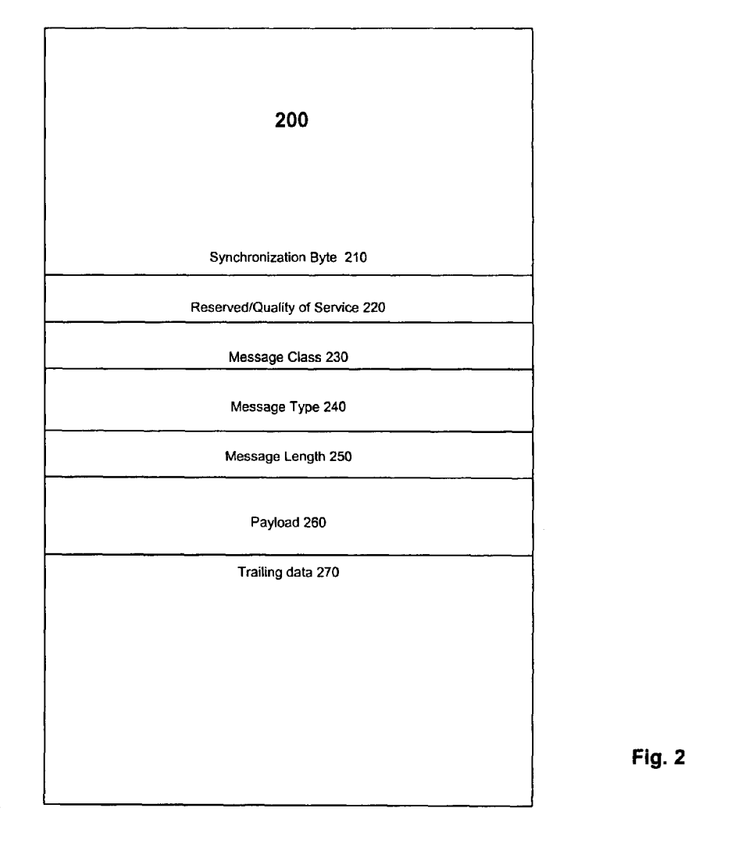
FIG. 2 is a block diagram of an exemplary messaging format for a media protocol.

FIG. 2 is a block diagram of an exemplary messaging format 200 for a media protocol. Messaging format 200 includes a synchronization byte 210, a reserved/quality of service field 220, a message class 230, a message type 240, a message length 250, a payload 260, and trailing data 270.

The synchronization byte 210 is used to indicate the beginning of a message. The synchronization byte 210 allows a listener to seek a potential valid frame if data gets corrupted between the distribution point and the listener.

The reserved/quality of service field 220 may be used to indicate a special status or priority for the message. The reserved/quality of service field 220 may be passed in the low four bits of the reserve byte. In one example, the reserved/quality of service field 220 may include a four-bit value whose high bit specifies whether this packet has to be delivered (a specification that is useful for the User Datagram Protocol (UDP)). The other three bits may be used to indicate the relative priority of the packet for use by a send queue. The high four bits may be used for other purposes.

The message class 230 may be used in combination with the message type 240 to identify a message. Separating the unique identifier into two units may improve performance. More particularly, the message class 230 is labeled so that a distribution point may examine the message class and decide whether the distribution point needs to examine the payload 260. Examining the payload may require additional processing cycles for parsing on the part of the distribution point. This may result in adverse performance under a heavy load.

Exemplary message classes are shown in Table 1:

TABLE 1

| Class | | Description |
| --- | --- | --- |
| 0x0 | Operations | Not Presently Defined |
| 0x1 | Broadcaster | Broadcaster⇔Distribution point. This is used in messages between a broadcaster and a distribution point. |
| 0x2 | Listener | Distribution point⇔Listener. This is used in messages between a distribution point and a listener. |
| 0x3 | Cacheable Metadata | Broadcaster→Listener via distribution point. This is used in cacheable metadata messages between a broadcaster and a listener and may be cached at the distribution point. |
| 0x4 | Cacheable Metadata | Broadcaster→Listener via distribution point. This is used in cacheable metadata messages between a broadcaster and a listener and may be cached at the distribution point. |
| 0x5 | Pass-through Metadata | Broadcaster→Listener via distribution point. This is used in metadata messages between a broadcaster and a listener. |
| 0x6 | Pass-through Metadata | Broadcaster→Listener via distribution point. This is used in metadata messages between a broadcaster and a listener. |

Metadata may include information associated with a stream to be interpreted by the listener. Examples of metadata include Stream-Title, Stream-URL (Uniform Resource Locator) (web-site content related to the streamed content), Stream-Image (binary data), or other data descriptive of the stream. Metadata may flow over the same data path as stream data, for example, to prevent web proxies and firewalls from rejecting multiple data connections. The broadcaster may ensure that a stream is not saturated with excessive metadata. Saturating a stream with excessive metadata may create a poor listener experience that may be avoided by intelligent management of metadata.

Metadata may originate from a broadcaster and pass through the distribution point for handling by the listener. The metadata may be sent infrequently compared to the amount of stream data. For example, an audio stream may include a metadata message that indicates a change in the song title. If a listener subscribes to the stream just after the song-change metadata has passed, the listener may not know the name of the song being played until the next song change. Therefore, one implementation of the media protocol provides for two types of metadata, cacheable metadata and pass-thru metadata.

Cacheable metadata may be deemed more vital to a stream such that the listener always should have the most recent cacheable metadata. In contrast, pass-thru metadata is stream-associated data that is not as vital such that the listener may not mind waiting for the pass-thru metadata.

Cacheable metadata may require the distribution point to cache metadata messages and transmit the metadata messages when the listener connects. Therefore, a point in the stream buffer at which data is cached may coincide with a point where a listener is placed in the stream buffer on a listener connect. Cached metadata messages also may be included in the stream to the listener during normal streaming. Including cacheable metadata messages in the stream ensures that listeners have the most recent cached metadata both at the beginning of a streaming session and afterwards. An exemplary metadata message format is shown below:

Message Class—Cacheable Metadata
Message Type—<metadata type>
Payload—[Metadata ID] [Metadata Span] [Metadata Index] [metadata]
   [Metadata ID] (16 bits)—used to identify a metadata set for when metadata is split across multiple messages.
   [Metadata Span] (16 bits)—the number of messages comprising the complete metadata package (numeric, may include a minimum 1 and a maximum 32).
   [Metadata Index] (16 bits)—the ordinal identification of this message within the metadata package (numeric, may include a minimum 1 and a maximum 32).
   [Metadata]—the metadata information.

As the sequencing system indicates, metadata may be split into multiple messages. Multiple metadata messages of the same type and metadata ID may be combined and interpreted by a listener as a single piece of metadata. Similarly, the distribution point may need to understand the metadata sequencing in order to properly cache fragmented metadata. For a given message type, if a message is received whose index is already cached, the distribution point may remove all of the metadata messages that the distribution point has cached for that message type and then cache the new message.

The pass-through metadata messages may use the same form as cacheable metadata. However, the distribution point may treat pass-thru messages as data messages and transmit the pass-thru metadata messages directly to the listeners.

The message type 240 may include 12 bits in the message header that specify the type of data encapsulated in the message.

Exemplary message types for a broadcaster component of the media protocol are shown below in Table 2. Note that although parameters such as "required?", "payload?", and "response?" are shown, the media protocol need not require these parameters.

TABLE 2

| Class | Type  | Description            | Required? | Payload? | Response? |
|-------|-------|------------------------|-----------|----------|-----------|
| 0x1   | 0x001 | Authenticate Broadcast | Yes       | Yes      | Yes       |
| 0x1   | 0x002 | Setup Broadcast        | Yes       | Yes      | Yes       |
| 0x1   | 0x003 | Negotiate Buffer Size  | Yes       | Yes      | Yes       |
| 0x1   | 0x004 | Standby                | Yes       | No       | Yes       |
| 0x1   | 0x005 | Terminate              | No        | No       | No        |
| 0x1   | 0x006 | Flush Cached Metadata  | No        | No       | No        |
| 0x1   | 0x007 | Require Listener Auth  | No        | Yes      | Yes       |
| 0x1   | 0x008 | Negotiate Max Payload Size | Yes   | Yes      | Yes       |
| 0x1   | 0x100 | Configure ICY-NAME     | No        | Yes      | Yes       |
| 0x1   | 0x101 | Configure ICY-GENRE    | No        | Yes      | Yes       |
| 0x1   | 0x102 | Configure ICY-URL      | No        | Yes      | Yes       |
| 0x1   | 0x103 | Configure ICY-PUB      | No        | Yes      | Yes       |

Broadcast Message Types (Messages types 0x100=>0x103) are used to configure properties for a SHOUTcast stream, should the distribution point support SHOUTcast listeners. SHOUTcast is a streaming protocol having configuration commands that allow the Name, Genre, Uniform Resource Locator, and other parameters to be specified.

The message length 250 specifies the length of the payload following the message header. In the example shown, the message length 250 is the third byte and high four bits of the fourth byte of the message header (e.g., the synchronization byte 210, the reserve/quality of service field 220, the message class 230, a message type 240, and the message length 250). Note that in the example shown, the message length 250 does not include the trailing data 270 (e.g., an 0x00 byte).

The payload 260 includes the data for a message. Typically, the size of the payload 260 is not restricted by the media protocol. Rather, the media protocol typically specifies how a broadcaster, a distribution point, and a listener negotiate and report the maximum size message that will be sent in a stream. Some implementations may require the message size to stay under a Maximum Transmission Unit (MTU), in which case the distribution point may enforce the MTU during negotiation of the maximum payload size.

The trailing data 270 (e.g., 0x00) in the payload 260 may be used to demark the end of a message and may be used by the listener to determine if a message is malformed.

Figure 3:
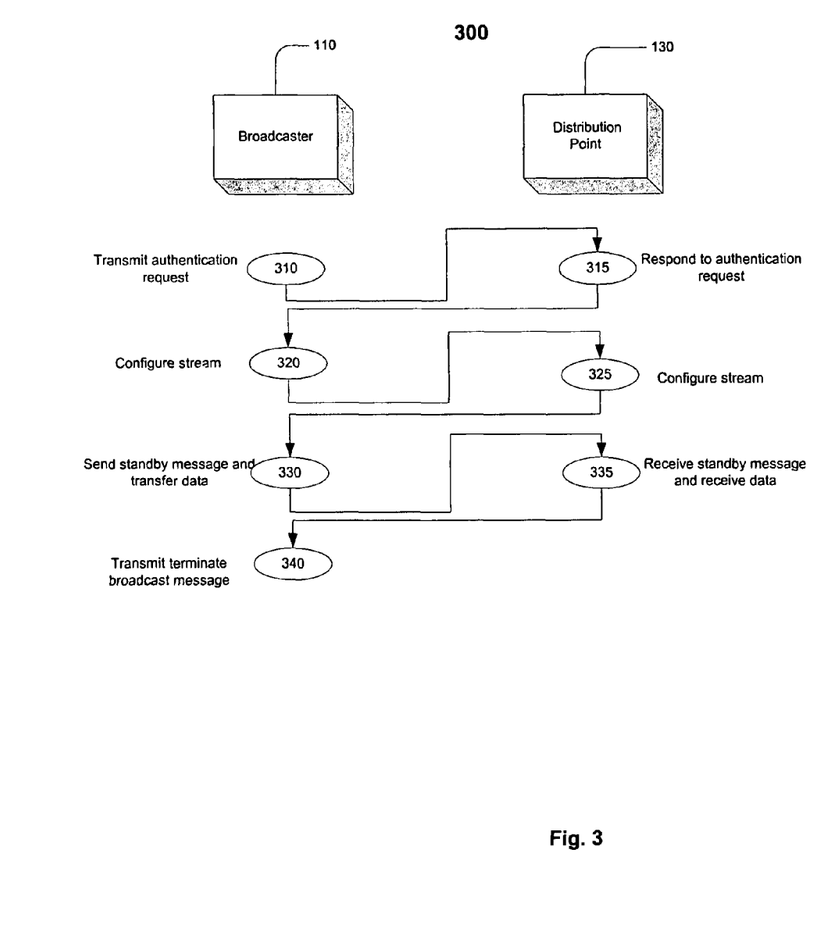
FIG. 3 is a flow chart of an exemplary process by which a broadcaster and a distribution point use a media protocol, and more particularly, a broadcasting component of the media protocol, to enable the distribution point to provide access to a stream.

FIG. 3 is a flow chart 300 of an exemplary process by which a broadcaster 110 and a distribution point 130 use a media protocol, and more particularly, a broadcasting component of the media protocol, to provide the distribution point 130 with access to a stream. For convenience, particular components and messaging formats described earlier are referenced as performing the process. However, similar methodologies may be applied in other implementations where different components are used to define the structure of the system, or where the functionality is distributed differently among the components shown.

The broadcaster 110 initiates an authentication request to the distribution point 130 (310). Generally, the broadcaster uses the authentication request to ensure that the stream is distributed only to trusted sources.

An exemplary authentication request payload is shown below.

Message Class—0x1
Message Type—0x001
Payload—<Version>:<SID>:<UID>:<Auth-Blob><NUL>
   <Version>—protocol version number (may be required, numeric, non-zero, maximum 255). The current version is 1.
   <SID>—stream identifier (may be required, numeric, non-zero, maximum 4294967295).
   <UID>—user identifier (may be required, string, maximum length of 64 bytes).
   <Auth-Blob>—authentication information (may be required, string, may include a maximum length of 1200 bytes).

Since the authentication request may be the first message required by the distribution point, the authentication request may feature a version number that can be used by the distribution point to handle future versions of the protocol specification. The distribution point may disconnect the broadcaster if the version is not supported.

The distribution point responds to the authentication request (315). The distribution point 120 may use the provided authentication credentials in the authentication request to verify the authenticity of the broadcaster. If the broadcaster is successfully authenticated, the distribution point responds with an authenticate broadcast message, of which an exemplary payload format is shown below:

ACK:<Version>:Allow\0

If the broadcaster fails authentication, the distribution point may respond with an Authenticate Broadcast message in an exemplary format shown below:

NAK:<Version>:<Reason>\0

Exemplary reasons for a failed authentication are shown in Table 3.

TABLE 3

| <Reason> | Description |
|----------|-------------|
| "Deny"           | Broadcaster denied by authentication service. |
| "Sequence Error" | The message was received out of sequence. |
| "Parse Error"    | The payload could not be parsed successfully. |
| "Version Error"  | The version is greater than what is supported. |

Following a failed (NAK) response to an authentication request, the distribution point may terminate the connection.

The successful completion of the authentication request and response (310 and 315) ends the authentication portion and commences the stream configuration phase.

The broadcaster and the distribution point configure the stream (320 and 325). Initially, the broadcaster sends a setup broadcast request message (320). The setup broadcast request message provides details about the stream the broadcaster will provide to the distribution point. The setup broadcast request message may include the Content-Type of the stream. Typically, the distribution point passes this information to listeners during a listener request for this stream. The setup broadcast request message also may include the average bit rate and the maximum bit rate of the stream, allowing for the possibility of variable bit rate streams. For fixed bit rate streams, the average bit rate is the maximum bit rate.

An exemplary setup broadcast request message is shown below:

Message Class—0x1
Message Type—0x002
Payload—<Avg Bit Rate>:<Max Bit Rate>\0

<Avg Bit Rate>—average bit rate (may be required, numeric, maximum 320, kbps).

<Max Bit Rate>—maximum bit rate (may be required, numeric, maximum 320, kbps).

If the broadcaster successfully sends the broadcast setup request message with the given values, the distribution point sends a broadcast setup response message back to the broadcaster with a message payload of "ACK\0" (325).

However if the distribution point rejects the broadcaster information, the distribution point may respond with a broadcast setup message with a message payload of "NAK:<Reason>\0" where exemplary reasons are shown in Table 4:

TABLE 4

| <Reason> | Description |
| --- | --- |
| "Sequence Error" | The message was received out of sequence. |
| "Parse Error" | The payload could not be parsed successfully. |
| "Bit Rate Error" | The bit rate is not valid or not supported. |

As part of the stream configuration operations, the broadcaster and the distribution point negotiate a buffer size. Inherently, the distribution point may have some internal buffer for messages that it uses to enable listener access to streams. A negotiate buffer size message allows the broadcaster and the distribution point to communicate some properties of that buffering mechanism. The broadcaster may ask the distribution point to setup a buffer of a specific size with a minimum threshold. The distribution point may otherwise have an internal buffer size defined that is too small for the amount of stream data, making it likely that listeners of the stream will receive a poor experience.

An exemplary negotiate buffer size request message is shown below:

Message Class—0x1
Message Type—0x003
Payload—<Desired Buffer Size>:<Minimum Buffer Size><NUL>
   <Desired Buffer Size>—desired buffer size (may be required, numeric, in units of KB).
   <Minimum Buffer Size>—minimum buffer size (may be required, numeric, in units of KB).

If the distribution point supports a buffer size greater than the minimum buffer size, the distribution point responds with a negotiate buffer size response message with payload "ACK:<negotiated buffer size>\0". The negotiated buffer size value may be in units of kilobytes. However, a failure to be able to provide an adequate buffer size results in the distribution point responding with a negotiate buffer size message with payload "NAK:<Reason>\0".

Exemplary reasons are shown in Table 5:

TABLE 5

| <Reason> | Description |
| --- | --- |
| "Sequence Error" | The message was received out of sequence. |
| "Parse Error" | The payload could not be parsed successfully. |
| "Buffer Size Error" | The buffer size is not valid or not supported. |

When the broadcaster completes sending configuration requests and is ready to begin streaming, the broadcaster sends a standby message to the distribution point, and then may begin streaming (330). The distribution point ensures configuration and authentication messages have been processed successfully. If the distribution point is setup successfully and ready to accept stream data from the broadcaster, it responds with a Standby message with payload "ACK:Data Transfer Mode\0" (335).

If the setup of the broadcaster has not been completed or there is a problem, the distribution point may respond with a message. One such exemplary message is "NAK:<Reason>\0".

Exemplary reasons are shown in Table 6:

TABLE 6

| <Reason> | Description |
| --- | --- |
| "Sequence Error" | The message was received out of sequence. |
| "Parse Error" | The payload could not be parsed successfully. |
| "Configuration Error" | The configuration is not complete. |

Information associated with a stream may be passed in metadata messages through the distribution point. Some of the metadata messages may be cached in the distribution point. The metadata message may inform the distribution point to discard existing cached metadata messages.

Typically, a metadata discard message has no payload and has an exemplary format of:

Message Class—0x1
Message Type—0x006
Payload—<empty>

The distribution point typically does not send a reply to the metadata discard message from the broadcaster.

The distribution point and the broadcaster may agree on a maximum payload size. This message allows the broadcaster to specify a desired maximum and minimum size for a message. An exemplary format is shown below:

Message Class—0x1
Message Type—0x007
Payload—<Ultravox Requirement>:<SHOUTcast Requirement>
   <Ultravox Requirement>—(may be required, character, 'Y', 'N', or 'D').
   <SHOUTcast Requirement>—(may be required, character, 'Y', 'N', or 'D').

The request provides the broadcaster 301 with the ability to specify an authentication requirement different from the configured default. If the distribution point successfully sets the authentication requirements, the distribution point replies to the broadcaster by sending a message with a payload of "ACK\0". Otherwise, the distribution point replies by sending the message with a payload of "NAK:<Reason>\0"

Exemplary reasons are shown in Table 7:

TABLE 7

| <Reason> | Description |
| --- | --- |
| "Sequence Error" | The message was received out of sequence. |
| "Parse Error" | The payload could not be parsed successfully. |

An exemplary format for a payload size message is shown below.

Message Class—0x1
Message Type—0x008
Payload—<desired max-payload size>:<minimum acceptable max-payload size>

If broadcaster uses the payload size negotiation to successfully configure the distribution point with the specified values, the distribution point sends a broadcast setup message back to the broadcaster with a message payload of "ACK:<negotiated max-payload size>\0".

However, if the distribution point rejects the broadcaster information, the distribution point may respond with a negotiate payload size message with a message payload of "NAK:<Reason>\0."

Exemplary reasons are shown in Table 8:

TABLE 8

| <Reason> | Description |
|---|---|
| "Sequence Error" | The message was received out of sequence. |
| "Parse Error" | The payload could not be parsed successfully. |
| "Payload Size Error" | The minimum acceptable max-payload size is not supported |

While transferring a stream, the broadcaster may decide to terminate the connection to the distribution point. For better handling of a termination (disconnect), the broadcaster sends a terminate broadcast message (340). The distribution point may not expect any messages following a terminate broadcast message and may unsubscribe any listeners and terminate the stream to free resources.

An exemplary terminate broadcast message format is shown below:
  Message Class—0x1
  Message Type—0x005
  Payload—<empty>

Normally, the broadcaster stops providing a stream by sending a terminate message to the distribution point, thereby making the stream no longer available for subscription by listeners. Other circumstances, that result in the termination of a stream, such as an idle-timeout and a reconnect-timeout, may be considered abnormal.

When a stream terminates normally, the distribution point may inform all listeners currently subscribed to the stream so that the stream is terminated by sending listeners a terminate broadcast message.

If the distribution point does not receive either a data or metadata message while in data streaming mode for some time, the distribution point may generate an idle timeout. When an idle timeout occurs, the distribution point may optionally disconnect from the broadcaster and abnormally terminate the stream provided by the broadcaster.

If the TCP (Transport Control Protocol) connection to a broadcaster is unexpectedly lost, the distribution point may allow the broadcaster an interval of time to reconnect and re-establish the stream. Some causes for this may include a network error or interruption, a software error, or other reason. The broadcaster may optionally reestablish the stream by sending an authenticate broadcast (e.g., 0x1001) message. However, if the distribution point detects that the broadcaster is reconnecting, the distribution point may choose to respond with an acknowledgement (ACK) message for the standby (e.g., 0x1004) message. The configuration operations may be skipped and the broadcaster may resume streaming in data transfer mode. Typically, the distribution point only sends the standby message (e.g., 0x1004) if the previous stream had completed the configuration operations.

If the broadcaster does not reconnect and reestablish the stream, a reconnect timeout occurs and the distribution point abnormally terminates the stream the broadcaster was providing. The reconnect timeout operation is an optional feature for the distribution point and may be handled by a broadcaster instead.

Figure 4:
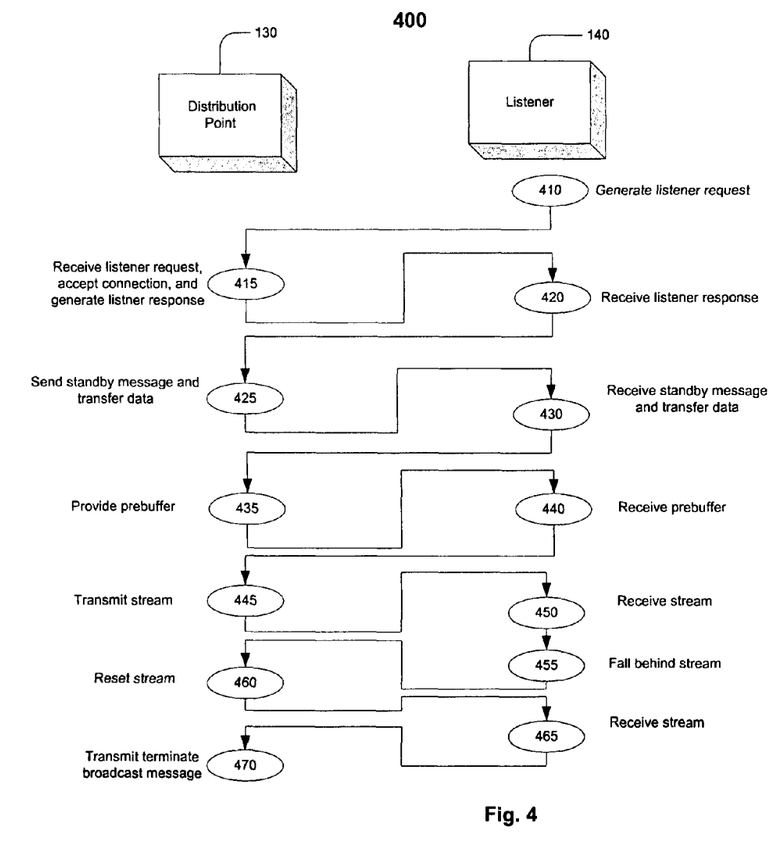
FIG. 4 is a flow chart of an exemplary process by which a distribution point provides a listener with access to a stream.

FIG. 4 is a flow chart 400 of an exemplary process by which a distribution point 130 provides a stream to a listener 140. For convenience, particular components and messaging formats described earlier are referenced as performing the process. However, similar methodologies may be applied in other implementations where different components are used to define the structure of the system, or where the functionality is distributed differently to among the components shown.

Generally, the distribution point 130 and the listener 140 uses a listener component in the media protocol so that a listener 140 may setup, receive, and terminate a stream. The listening component allows listeners behind firewalls and proxies to make a request without submitting additional configuration or security clearance information. A listener 140 may use a specific format for identification, such as, for example, using the sub-string "ultravox/1.0" in the "User-Agent" header (e.g., in an initial HTTP GET request).

Generally, the listener 140 generates a listener request for a stream of interest (410). Typically, the listener 140 supplies a stream identifier (SID) to identify the stream of interest to the distribution point 130. An exemplary listener request is shown below:
  GET /stream/<SID>?{<key>{&<value>}} HTTP/1.1\r\n
  Host: duplicatingswitch.aol.com\r\n
  User-Agent: duplicatingswitch/1.0\r\n
  Ultravox-transport-type: TCP\r\n
  Accept: */*\r\n
  . . .
  \r\n
where a <key> may include
  a prebuffer time ("prebuffertime=<seconds>"),
  a user identifier ("uid=<UID>"), or
  an authentication blob ("authblob=<Auth-Blob>").

The three defined <key> fields are optional. If either the UID or the Auth-Blob is not specified, the distribution point may substitute an empty string when attempting to authenticate the listener with an authentication server, assuming that authentication is required for the given SID. However, depending on the configuration of the distribution point, the listener request may be denied if one or more of the key-value pairs are not specified. For example, if a specified stream (e.g., stream 555) requires listener authentication and the listener asks for the specified stream (e.g., stream 555) without providing a uid or authblob key-value, the listener may be denied access.

If the distribution point accepts the connection, authenticates the listener, and sets up a streaming session for the listener, the distribution point may respond to a listener response message (415). An exemplary listener response message is shown below:
  HTTP/1.1 200 OK\r\n
  Server: Ultravox 1.0\r\n
  Content-Type: misc/ultravox\r\n
  Ultravox-Max-Msg: <negotiated max payload size>
  Ultravox-SID: <SID>
  Ultravox-Avg-Bitrate: <avg bitrate>\r\n
  Ultravox-Max-Bitrate: <max bitrate>\r\n\r\n In the preceding listener response, the "negotiated max payload size", "SID", "avg bitrate", and "max bitrate" are populated based on the values provided during broadcast negotiation.

Table 9 is an exemplary list of listener responses for a listener request.

TABLE 9

| Response | Description |
|---|---|
| "HTTP/1.1 200 OK" | Authentication allowed |
| "HTTP/1.1 400 Bad Request" | Request can not be parsed |

TABLE 9-continued

| Response | Description |
|---|---|
| "HTTP/1.1 403 Forbidden" | Authentication denied |
| "HTTP/1.1 404 Not Found" | Stream not available |

The listener receives the listener response (420). The distribution point sends a standby message and transfers data (425). The listener receives the standby message and receives data (430).

Prebuffering is an operation by which the listener provides resiliency in pursuit of an interruption-free streaming experience. Since network conditions may change quickly and fluctuate over the duration of a streaming session, the distribution point may send some data to the listener at the beginning of the streaming session to provide a reserve of content that may be rendered in the event of a network interruption, thus improving the listener experience (435). The listener receives the prebuffer (440). Stream data then may be inserted at the end of buffered data while the listener reads data from the front of the buffer. To setup the streaming session more quickly, the data in the stream intended for the buffer may be sent at an accelerated rate. However, the distribution point should respect a TCP window for the listener when sending the data intended for the buffer at an accelerated rate and in particular, account for a TCP slow start. The amount of data sent in the prebuffer phase may be determined by the number of seconds specified by the prebuffer time argument in the listener request. If the prebuffer time is not provided, the distribution point may make an assumption about the prebuffer size. A prebuffer time of zero means that no data is prebuffered.

With the prebuffer (or without a prebuffer is none is being used), the distribution point transmits the stream (445), which the listener receives (450).

If the listener is not able to keep up with the specified bit rate of the stream, the listener falls behind (455). If the listener falls far behind, the distribution point may overwrite stream data that the listener has not yet received. At this time the distribution point may reset the listener (460), skipping the listener ahead in the stream data. The listener receives the stream (465). Upon completion of the stream, the distribution point transmits a termination message to terminate the stream (470).

Other implementations are within the scope of the following claims. For example, depending on the protocol implementation, the message boundaries may be corrupted while moving a pointer for a listener inside of a buffer such that the listener receives corrupt data on a reset. The distribution point need not abide by message boundaries when moving the listener, however it is recommended.

The resynchronization may be handled by the listener using a Max-Msg value, a message length, a trailing data field (e.g., 0x00), or a synchronization byte using the exemplary resynchronization operation shown below:

1. If message starts with a synchronization byte, read a payload length.
2. If a payload length is greater than Max-Msg value, then search for the next synchronization byte and start over.
3. Read in enough data to check the trailing data (e.g., 0x00) after the payload
4. If the trailing data (e.g., 0x00) is not present, search from the beginning of the message for the next synchronization byte and start over.
5. Otherwise, extract the payload and continue reading and extracting messages.

What is claimed is:

1. A system configured to use a media protocol to provide a distribution point with a stream from a broadcaster, the system comprising:
   a controller implementing the media protocol, the media protocol including a message class indicating an applicability of a message to a distribution point and the following messages:
      an authentication message authenticating the broadcaster to the distribution point and including a stream identifier,
      a stream configuration message configuring the stream to be distributed by the distribution point,
      a pass-through metadata message containing pass-through metadata for the stream, and
      a cacheable metadata message containing cacheable metadata for the stream and including a metadata ID for splitting the metadata across multiple messages; and
   wherein the controller implements the media protocol to:
      receive from the broadcaster, before connection of a listener, the stream at the distribution point, the stream including stream data and pass-through metadata and cacheable metadata for the stream, the stream data, pass-through metadata, and cacheable metadata being provided in separate packets, and store the cacheable metadata but not the pass-through metadata at the distribution point;
      provide, upon connection of the listener, the stored cacheable metadata for the stream to the listener; and
      receive, after connection of the listener, the stream data and pass-through and cacheable metadata for the stream at the distribution point and provide the stream data, cacheable metadata, and pass-through metadata to the listener.

2. The system of claim 1 wherein the messages in the media protocol include a type parameter that may include the authenticate broadcast, setup broadcast, negotiate buffer size, standby, terminate, flush cached metadata, require listener authentication, and negotiate maximum payload size message types.

3. The system of claim 2 wherein the type parameter for the authentication message is 0x001.

4. The system of claim 2 wherein the type parameter for the stream configuration message is 0x003 for a stream configuration message negotiating a buffer size.

5. The system of claim 2 wherein the type parameter for the stream configuration message is 0x004 for a stream configuration message instructing the distribution point to standby.

6. The system of claim 2 wherein the type parameter for the flush cached metadata message is 0x006.

7. The system of claim 2 wherein the type parameter for the require listener authentication message is 0x007, the require listener authentication message indicating that the distribution point should prompt a listener for authentication.

8. The system of claim 1 wherein the authentication message includes a message class of 0x1 and a message type of 0x01.

9. The system of claim 1 wherein the authentication message includes a payload with a protocol version number, a user identifier and authentication information.

10. The system of claim 9 wherein
   the protocol version is between 0 and 255,
   the stream identifier is non zero and is less than 429467295,
   the user identifier is a strong and of a maximum length of 64 bytes, and the authentication information is a string of a maximum length of 1200 bytes.

11. The system of claim 1 wherein the metadata flows over a same data path as the stream data.

12. The system of claim 1, wherein the stored cacheable metadata is added to the stream provided by the distribution point to the listener upon listener connection.

13. A method of distributing content in a stream between a broadcaster and an audience through a distribution point using a media protocol, the method comprising:
   receiving, at the distribution point, an authentication message authenticating a broadcaster to the distribution point, the authentication message including a stream identifier;
   receiving, at the distribution point, a stream configuration message configuring the stream being distributed on the distribution point;
   receiving the stream at the distribution point, the stream including stream data and pass-through metadata and cacheable metadata, the stream data, pass-through metadata, and cacheable metadata being provided in separate packets, the cacheable metadata including a metadata ID for splitting the metadata across multiple messages;
   storing cacheable metadata but not pass-through metadata at the distribution point; and
   providing, by the distribution point, the stored cacheable metadata for the stream to a listener upon listener connection to the distribution point;
   providing, by the distribution point, stream data, cacheable metadata, and pass-through metadata for the stream to the listener after listener connection to the distribution point.

14. The method of claim 13, wherein the stream configuration message comprises a buffer configuration message indicating a buffer size for the distribution point.

15. The method of claim 13, wherein the stream configuration message comprises a standby configuration message instructing the distribution point to standby.

16. The method of claim 13 further comprising receiving, by the distribution point, a require listener authentication message instructing the distribution point to prompt a listener for authentication.

17. The method of claim 13 wherein the metadata flows over a same data path as the stream data.

18. The method of claim 13, wherein providing the stored cacheable metadata for the stream upon listener connection comprises adding the stored cacheable metadata to the stream provided by the distribution point to the listener.

19. A distribution server for distributing a stream, the server comprising:
   a reception unit receiving the stream and pass-through and cacheable metadata associated with the stream from a broadcaster, the cacheable metadata including a metadata ID for splitting the metadata across multiple messages, and the stream being associated with a stream identifier;
   a determination unit determining whether metadata associated with the stream is pass-through or cacheable metadata;
   a cache storing cacheable metadata but not pass-through metadata;
   a distribution unit providing the stream to one or more connected listeners, the stream including the stream data, the cacheable metadata, and the pass-through metadata, the stream data, pass-through metadata, and cacheable metadata being provided in separate packets, wherein the distribution unit provides each connected listener, upon the connection of that connected listener, cacheable metadata received from the broadcaster with the stream and stored before that listener connected and the distribution unit only provides that connected listener pass-through metadata received after the connection of that connected listener.

20. The distribution server of claim 19, wherein the stream data, the cacheable metadata, and the pass-through metadata are sent on the same data path to the connected listeners.

21. The distribution server of claim 19, wherein the cacheable metadata includes a metadata span for indicating a number of messages that make up a metadata package.

22. The distribution server of claim 21, wherein the cacheable metadata includes a metadata index for indicating a message position within the metadata package.

23. The distribution server of claim 19, wherein providing each connected listener cacheable metadata stored before that listener connected comprises adding the stored cacheable metadata to the stream provided by the distribution point to the listener.

* * * * *